Nov. 12, 1968  KUNIO HONMA  3,410,705
CERAMIC DIELECTRICS
Filed May 12, 1964  6 Sheets-Sheet 1

Kunio Honma
INVENTOR.

BY Wenderoth,
Lind and Ponack,
attorneys 3,410,705
CERAMIC DIELECTRICS
Kunio Honma, Honjyo-shi, Akita-ken, Japan, assignor to TDK Electronics Co., Ltd., Tokyo, Japan
Filed May 12, 1964, Ser. No. 366,733
Claims priority, application Japan, May 22, 1963, 38/25,524; Oct. 30, 1963, 38/57,494, 38/57,495, 38/57,496, 38/57,497
6 Claims. (Cl. 106—39)

ABSTRACT OF THE DISCLOSURE

Ceramic dielectric materials are provided which consist essentially of a sintered mixture of $BaTiO_3$, $PbTiO_3$ and $Bi_2(SnO_3)_3$. The materials are prepared by preparing a mixture of the following composition:
(a) barium titanate preparing by mixing barium carbonate and titanium oxide in equimolar amounts followed by calcining at a temperature of about 1280° C.;
(b) lead oxide;
(c) titanium oxide;
(d) bismuth oxide, and
(e) tin oxide.
This mixture is sintered in air at a temperature in the range of 1100° C. to 1400° C. In one aspect of the invention the ceramic dielectric materials contain, in addition, a mineralizer selected from the group consisting of vanadium oxide, lanthanum oxide, niobium oxide and tungsten oxide.

---

Figure 1:
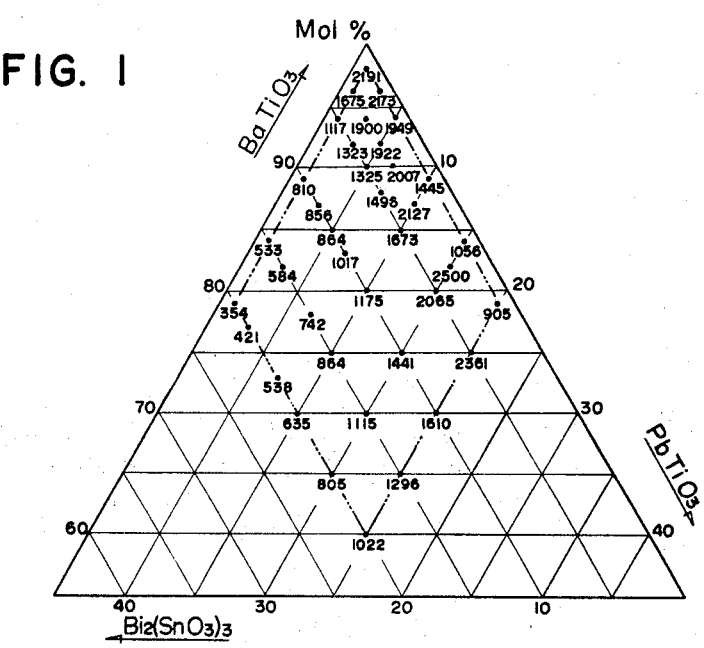

The present invention relates to an improvement in ceramic dielectrics. The object of the invention is to provide ceramic dielectrics, especially capacitor dielectrics, which have good temperature characteristics, high Q-values and small dielectric losses.

Generally, such properties are required in capacitor dielectrics as stability to temperature change, over relatively wide temperature, low dielectric losses and high capacity to withstand voltage or electrical insulation resistance. From such point of view, barium titanate ($BaTO_3$) type ceramic ferro-electric bodies have been well known but they are not entirely satisfactory dielectrics. Because barium titanate ($BaTiO_3$) dielectrics have a Curie point close to 120° C. (refer to FIGURE 12 of accompanying drawings) and the dielectric constant thereof rises sharply to a very high peak at this point, this prejudices applicability of such dielectrics in a field where good stability of dielectric constant to temperature change is required.

In order to obtain flat temperature characteristics of such dielectric constants, many attempts have been made. For example, adding barium zirconate ($BaZrO_3$), strontium titanate ($SrTiO_3$), etc. to barium titanate ($BaTiO_3$) results in shifting the Curie point toward relatively lower temperature, or adding calcium titanate ($CaTiO_3$), magnesium titanate ($MgTiO_3$), etc. to barium titanate ($BaTiO_3$) results in minimizing the temperature change of dielectric constant. In spite of some improvements in temperature characteristics by these attempts, the utility is extremely prejudiced because of increasing of dielectric loss and decreasing of dielectric constant.

The characteristic feature of the invention is to make it possible to produce a ceramic dielectric which has high dielectric constant ($\epsilon$) and good temperature characteristic and low dielectric loss (tan $\delta$) by adding lead titanate ($PbTiO_3$) and bismuth stannate ($Bi_2(SnO_3)_3$) to barium titanate ($BaTiO_3$).

The properties of the ceramic dielectrics of this invention are considered with varying proportions of composition, and following results have been obtained. When the proportion of barium titanate ($BaTiO_3$) exceeds 98 molar percent, the temperature characteristic of dielectric contant ($\epsilon$) becomes poor and its rate of change is more than 20% accompanied by difficulty of sintering. When the proportion of barium titanate ($BaTiO_3$) is below 60 molar percent, the dielectric loss (tan $\delta$) becomes larger and at the same time, change in dielectric constant with temperature is more than 20%. And when the proportion of lead titanate ($PbTiO_3$) exceeds 20 molar percent, the dielectric loss (tan $\delta$) becomes larger and temperature characteristic becomes poor, or when it is below 1 molar percent, dense ceramic material cannot be obtained because of elevation of sintering temperature. Furthermore when the proportion of bismuth stannate ($Bi_2(SnO_3)_3$) exceeds 20 molar percent, the dielectric constant ($\epsilon$) becomes smaller, and temperature characteristic becomes poor, and when it is below 1 molar percent, poor temperature characteristic and large temperature coefficient of dielectric constant ($\epsilon$) result.

According to these experiments mentioned hereinabove, the best proportions of the said three ingredients are defined as follows:

| | Molar percent |
|---|---|
| $BaTiO_3$ | 60–98 |
| $PbTiO_3$ | 1–20 |
| $Bi_2(SnO_3)_3$ | 1–20 |

The following table represents the electrical properties of the ceramic dielectrics in accordance with this invention.

(A) These specimen are prepared as hereinafter described; To barium titanate, which is prepared by mixing barium carbonate ($BaCO_3$) and titanium (IV) oxide ($TiO_2$) in equimolar percent, and then calcining at 1280° C., lead (II) oxide PbO, titanium (IV) oxide ($TiO_2$), bismuth (III) oxide ($Bi_2O_3$) and tin (IV) oxide $SnO_2$) are added. Then the mixture is sintered in air in the temperature range of 1100° C.–1400° C. All these properties herein have been measured at a frequency of 1 kc./s. In this disclosure 1 kc./s. means one kilocycle per second.

TABLE 1

| Specimen No. | BaTiO$_3$ | PbTiO$_3$ | Bi$_2$(SnO$_3$)$_3$ | $\epsilon$ | tan $\delta$, percent | 500 v. IR10$^5$, M$\Omega$ | Change in capacitance (−30° C.−+85° C.) | | | | Final Sintering temperature, °C. |
|---|---|---|---|---|---|---|---|---|---|---|---|
| | | | | | | | Maximum in positive | | Maximum in negative | | |
| | | | | | | | Percent | °C. | Percent | °C. | |
| 1$_1$ | 90 | 7 | 3 | 2,007 | 2.225 | 7.9–9.8 | 4.3 | 85 | 2.0 | 40 | 1,200 |
| 2$_2$ | 88 | 7 | 5 | 1,496 | 1.800 | 4.0–4.7 | 2.2 | −30 | 0.6 | 50 | 1,170 |
| 3$_3$ | 83 | 7 | 10 | 1,017 | 1.415 | 2.8–3.1 | 3.3 | −30 | 6.0 | 85 | 1,170 |
| 4$_4$ | 96 | 3 | 1 | 2,173 | 3.705 | 20–30 | 17.7 | 85 | 14.0 | −30 | 1,340 |
| 5$_5$ | 94 | 3 | 3 | 1,900 | 1.390 | 5.3–6.1 | 5.6 | −30 | 3.3 | 80 | 1,270 |
| 6$_6$ | 92 | 3 | 5 | 1,323 | 1.125 | 2.8–3.3 | 3.6 | −30 | 3.4 | 85 | 1,270 |
| 7$_7$ | 87 | 3 | 10 | 856 | 1.100 | 2.6–3.0 | 1.8 | −30 | 4.3 | 85 | 1,180 |
| 8$_8$ | 94 | 5 | 1 | 1,949 | 3.85 | 25–31 | 15.0 | 85 | 16.1 | −30 | 1,340 |
| 9$_9$ | 92 | 5 | 3 | 1,922 | 1.600 | 7.7–10.0 | 6.5 | +85 | 1.5 | −30 | 1,240 |
| 10$_{10}$ | 90 | 5 | 5 | 1,325 | 1.335 | 3.4–3.8 | 2.9 | +85 | 2.3 | 85 | 1,170 |
| 11$_{11}$ | 85 | 5 | 10 | 864 | 1.310 | 2.6–2.8 | 2.0 | −30 | 2.6 | 85 | 1,170 |
| 12$_{12}$ | 89 | 10 | 1 | 1,445 | 3.600 | 20–28 | 18.5 | 85 | 14.9 | −30 | 1,360 |
| 13$_{13}$ | 87 | 10 | 3 | 2,127 | 2.200 | 11.3–14.4 | 12.3 | 85 | 7.9 | −30 | 1,170 |
| 14$_{14}$ | 85 | 10 | 5 | 1,673 | 1.440 | 3.9–4.7 | 0.5 | 5 | 2.4 | 80 | 1,170 |
| 15$_{15}$ | 80 | 10 | 10 | 1,175 | 2.200 | 3.5–4.0 | 6.2 | 85 | 5.1 | −30 | 1,150 |
| 16$_{16}$ | 84 | 15 | 1 | 1,056 | 3.550 | 15–18 | 13.2 | 85 | 16.0 | −30 | 1,330 |
| 17$_{17}$ | 82 | 15 | 3 | 2,500 | 2.90 | 15.5–19.2 | 11.3 | 85 | 20.0 | −30 | 1,200 |
| 18$_{18}$ | 80 | 15 | 5 | 2,065 | 2.300 | 6.5–8.3 | 4.8 | 85 | 10.0 | −30 | 1,150 |
| 19$_{19}$ | 75 | 15 | 10 | 1,441 | 3.250 | 6.4–8.5 | 0.7 | 85 | 10.0 | −30 | 1,150 |
| 20$_{20}$ | 75 | 20 | 5 | 2,361 | 3.555 | 10.7–12.5 | 4.2 | 85 | 175 | −30 | 1,150 |
| 21$_{21}$ | 70 | 20 | 10 | 1,610 | 4.300 | 6.6–9.7 | 5.5 | 85 | 13.7 | −30 | 1,150 |
| 22$_{22}$ | 98 | 1 | 1 | 2,191 | 3.425 | 11.9–19.0 | 19.2 | 85 | 9.8 | −30 | 1,300 |
| 23$_{23}$ | 96 | 1 | 3 | 1,675 | 2.04 | 5.5–7.0 | 8.5 | 85 | 6.4 | −30 | 1,180 |
| 24$_{24}$ | 94 | 1 | 5 | 1,117 | 1.000 | 3.7–4.5 | 3.1 | 85 | 2.0 | −30 | 1,180 |
| 25$_{25}$ | 89 | 1 | 10 | 810 | 1.185 | 2.4–2.5 | 6.2 | +85 | 3.6 | −30 | 1,160 |
| 26$_{26}$ | 84 | 1 | 15 | 533 | 0.75 | 2.2–2.7 | 4.5 | −30 | 9.3 | 85 | 1,180 |
| 27$_{27}$ | 82 | 3 | 15 | 584 | 0.875 | 2.0–2.3 | 2.9 | −25 | 7.0 | 85 | 1,180 |
| 28$_{28}$ | 78 | 7 | 15 | 742 | 0.780 | 2.3–2.6 | 1.9 | −20 | 4.9 | 85 | 1,170 |
| 29$_{29}$ | 75 | 10 | 15 | 864 | 1.600 | 2.4–2.9 | 0.7 | 85 | 5.1 | −30 | 1,180 |
| 30$_{30}$ | 70 | 15 | 15 | 1,115 | 2.480 | 3.5–3.7 | 3.6 | 85 | 2.4 | −30 | 1,170 |
| 31$_{31}$ | 65 | 20 | 15 | 1,296 | 3.500 | 4.4–5.6 | 1.9 | 85 | 17.4 | −30 | 1,170 |
| 32$_{32}$ | 79 | 1 | 20 | 354 | 2.000 | 12.1–25.0 | 3.8 | 85 | 3.3 | 85 | 1,180 |
| 33$_{33}$ | 77 | 3 | 20 | 421 | 1.215 | 4.1–7.5 | 2.6 | −30 | 7.5 | 85 | 1,180 |
| 34$_{34}$ | 73 | 7 | 20 | 538 | 1.235 | 1.8–2.3 | 2.7 | −20 | 9.3 | 85 | 1,180 |
| 35$_{35}$ | 70 | 10 | 20 | 635 | 1.380 | 1.8–2.3 | 4.0 | −30 | 10.0 | 85 | 1,180 |
| 36$_{36}$ | 65 | 15 | 20 | 805 | 2.100 | 2.4–2.7 | 2.2 | −10 | 8.0 | 85 | 1,180 |
| 37$_{37}$ | 60 | 20 | 20 | 1,022 | 3.200 | 2.7–3.1 | 0.5 | 15 | 15.0 | −30 | 1,180 |

It is important as another characteristic feature of this invention to be able to achieve further improvements of characteristics of ceramic dielectrics, by adding mineralizer such as vanadium (V) oxide ($V_2O_5$), lanthanum (III) oxide ($La_2O_3$), niobium (V) oxide ($Nb_2O_5$) or tungsten (VI) oxide ($WO_3$) to a basic composition which is composed of the three major components, barium titanate ($BaTiO_3$), lead titanate ($PbTiO_3$) and bismuth stannate ($Bi_2(SnO_3)_3$). This will be made clear by the following explanation with reference to Table 2.

In the case of adding vanadium (V) oxide ($V_2O_5$) as a mineralizer to the basic composition of barium titanate ($BaTiO_3$), lead titanate ($PbTiO_3$) and bismuth stannate ($Bi_2(SnO_3)_3$), the consideration of its electrical properties has been tried with variation of quantity of the said mineralizer.

When the quantity of addition of vanadium (V) oxide is below 0.05 percent by weight, the effect of improvement by addition is not so remarkable. When the quantity of vanadium (V) oxide exceeds 2.0 percent by weight, poor temperature characteristic, more than 2 percent of dielectric loss (tan $\delta$) and difficulty of preparing dense ceramic material by increasing of porosity result.

Consequently, when the quantity of addition of vanadium (V) oxide lies between 0.05 and 2.0 (percent by weight), the effect of the addition is most remarkable, that is to say, the temperature characteristic is very good and dielectric constant is maintained high enough for practical use and the dielectric loss (tan $\delta$) is low.

The following table 2 shows the electrical properties of the ceramic dielectrics which have been thus prepared, by adding vanadium (V) oxide ($V_2O_5$) in an amount ranging from 0 to 3.0 percent by weight to the basic composition of 96 molar percent barium titanate ($BaTiO_3$), 1 molar percent of lead titanate ($PbTiO_3$) and 3 molar percent of bismuth stannate ($Bi_2(SnO_3)_3$), shaping the mixture and then sintering it at the temperature of 1180° C. All measurements hereinafter set forth have been carried out at a frequency of 1 kc./s.

TABLE 2

| Specimen No. | $V_2O_5$ percent by weight | $\epsilon$, tan $\delta$ at room temperature | | Change in dielectric constant (−30° C.−+85° C.) | | | |
|---|---|---|---|---|---|---|---|
| | | | | Maximum in positive | | Maximum in negative | |
| | | $\epsilon$ | tan $\delta$, percent | Percent | °C. | Percent | °C. |
| 1 ⊙ | 0 | 1,675 | 2.04 | 8.5 | 85 | −6.4 | −30 |
| 2 ▲ | 0.05 | 1,642 | 1.95 | 3.6 | 85 | −1.5 | −30 |
| 3 ○ | 0.1 | 1,598 | 1.77 | 1.0 | −30 | −0.8 | 60 |
| 4 × | 0.3 | 1,571 | 1.63 | 2.2 | −30 | −2.5 | 85 |
| 5 △ | 0.5 | 1,556 | 1.81 | 2.7 | −30 | −0.6 | −30 |
| 6 □ | 1.0 | 1,534 | 1.85 | 5.5 | −30 | −2.8 | −30 |
| 7 ● | 2.0 | 1,510 | 1.88 | 7.7 | −30 | −3.7 | −30 |
| 8 ■ | 3.0 | 1,383 | 2.10 | 10.3 | −30 | −5.1 | −30 |

In the case of adding lanthanum (III) oxide ($La_2O_3$) as a mineralizer to a basic composition consisting of barium titanate ($BaTiO_3$), lead titanate ($PbTiO_3$) and bismuth stannate ($Bi_2(SnO_3)_3$), the consideration of the properties has been tried with variation of quantity of the mineralizer. When the quantity of lanthanum (III) oxide ($La_2O_3$) as a mineralizer is below 0.05 percent by weight, the effect of improvement by addition is not so remarkable. When the quantity of lanthanum (III) oxide exceeds 2.0 percent by weight, the dielectric constant becomes extremely low, and the temperature characteristic has a larger change in capacitance than in the case of no addition.

Consequently, when the quantity of lanthanum (III) oxide lies between 0.05 and 2.0 percent by weight, the effect of addition is most effective, that is, the temperature characteristic of the body obtained is very excellent and quite useful dielectric constant is maintained and the dielectric loss is low.

The following Table 3 shows the dielectric constant ($\epsilon$), dielectric loss (tan $\delta$) and temperature characteristic, change in dielectric constant depending upon temperature of the ceramic dielectrics which have been prepared as follows; adding lanthanum (III) oxide ($La_2O_3$) ranging from 0 to 3.0 percent by weight of a composition consisting of 96 molar percent of barium titanate ($BiTiO_3$), 1 molar percent of lead titanate ($PbTiO_3$) and 3 molar percent of bismuth stannate ($Bi_2(SnO_3)_3$), shaping the mixture and then sintering it at the temperature of 1180° C. All measurements have been carried out at a frequency of 1 kc./s.

change in dielectric constant depending upon temperature of the ceramic dielectrics which have been prepared as follows: adding niobium (V) oxide ($Nb_2O_5$) ranging from 0 to 3.0 percent by weight to a composition consisting of 96 molar percent of barium titanate ($BaTiO_3$), 1 molar percent of lead titanate ($PbTiO_3$) and 3 molar percent of bismuth stannate ($Bi_2(SnO_3)_3$), shaping the mixture and then sintering of it at the temperature of 1180° C. All measurements have been carried out at a frequency of 1 kc./s.

TABLE 4

| Specimen No. | $Nb_2O_5$ percent by weight | $\epsilon$, tan $\delta$ at room temperature | | Temperature characteristic change in dielectric constant (−30° C.−+85° C.) | | | |
|---|---|---|---|---|---|---|---|
| | | $\epsilon$ | tan $\delta$, percent | Maximum in positive | | Maximum in negative | |
| | | | | Percent | ° C. | Percent | ° C. |
| 1 ⊙ | 0 | 1,675 | 2.04 | 8.5 | 85 | −6.4 | −30 |
| 2 ▲ | 0.05 | 1,603 | 1.78 | 3.9 | 85 | −2.4 | −30 |
| 3 ○ | 0.1 | 1,584 | 1.68 | 2.8 | 85 | −1.2 | −30 |
| 4 × | 0.3 | 1,493 | 1.60 | 0.5 | −5 | −1.0 | 60 |
| 5 △ | 0.5 | 1,452 | 1.50 | 1.0 | −20 | −1.2 | 65 |
| 6 □ | 1.0 | 1,355 | 1.31 | 2.1 | −30 | −2.6 | 70 |
| 7 ● | 2.0 | 1,288 | 1.02 | 4.1 | −30 | −5.6 | 85 |
| 8 ■ | 3.0 | 935 | 0.93 | 6.7 | −30 | −9.9 | 85 |

Finally, a consideration has been tried with variation of quantity of tungsten oxide ($WO_3$) as a mineralizer which is added to a basic composition consisting of barium titanate ($BaTiO_3$), lead titanate ($PbTiO_3$) and bismuth stannate ($Bi_2(SnO_3)_3$). In consequence, it is found that when the quantity of tungsten oxide ($WO_3$) lies between 0.05 and 2.0 percent by weight, the effect of addition is most efficient. That is to say, when the quantity of tungsten

TABLE 3

| Specimen No. | $La_2O_3$ percent by weight | $\epsilon$, tan $\delta$ at room temperature | | Temperature characteristic change in dielectric constant (−30° C.−+85° C.) | | | |
|---|---|---|---|---|---|---|---|
| | | $\epsilon$ | tan $\delta$, percent | Maximum in positive | | Maximum in negative | |
| | | | | Percent | ° C. | Percent | ° C. |
| 1 ⊙ | 0 | 1,675 | 2.04 | +8.5 | +85 | −6.4 | −30 |
| 2 ▲ | 0.05 | 1,660 | 1.88 | +6.1 | +85 | −3.2 | −30 |
| 3 ○ | 0.1 | 1,652 | 1.86 | +4.8 | +85 | −2.3 | −30 |
| 4 × | 0.3 | 1,608 | 1.75 | +3.7 | +85 | −1.7 | −30 |
| 5 △ | 0.5 | 1,592 | 1.60 | +0.7 | −30 | −1.0 | +60 |
| 6 □ | 1.0 | 1,556 | 1.40 | +2.8 | +85 | −2.3 | +60 |
| 7 ● | 2.0 | 1,484 | 1.23 | +4.2 | +85 | −5.8 | +85 |
| 8 ■ | 3.0 | 1,155 | 1.05 | +7.9 | +85 | −10.1 | +85 |

In the case of adding niobium (V) oxide ($Nb_2O_5$) as a mineralizer to basic composition consisting of barium titanate ($BaTiO_3$), lead titanate ($PbTiO_3$) and bismuth stannate ($Bi_2(SnO_3)_3$), the consideration of the electrical properties has been tried with variation of quantity of the mineralizer. When the quantity of niobium (V) oxide ($Nb_2O_5$) as a mineralizer is below 0.05 percent by weight, the effect of improvement by addition is not so noticeable. When the quantity of niobium (V) oxide exceeds 2.0 percent by weight, the dielectric constant becomes extremely low, and the temperature coefficient of the dielectric constant becomes larger.

Consequently, when the quantity of niobium (V) oxide lies between 0.05 and 2.0 percent by weight, the effect of addition is most effective.

The following Table 4 shows the dielectric constant ($\epsilon$), dielectric loss (tan $\delta$) and temperature characteristic, oxide ($WO_3$) is below 0.05 percent by weight, the effect of improvement by addition is not so noticeable. When the quantity exceeds 2.0 percent by weight, the temperature coefficient of dielectric constant becomes larger and the dielectric loss reaches more than 2 percent and it becomes difficult to produce dense ceramics body by increasing porosity.

Table 5 shows the dielectric constant ($\epsilon$), dielectric loss (tan $\delta$) and change in dielectric constant depending on temperature of the ceramic dielectrics which have been prepared as follows: adding tungsten oxide ($WO_3$) to a composition consisting of 96 molar percent of barium titanate ($BaTiO_3$), 1 molar percent of lead titanate ($PbTiO_3$) and 3 molar percent of bismuth stannate ($Bi_2(SnO_3)_3$), shaping the mixture and then sintering it at the temperature of 1180° C. All measurements have been carried out at a frequency of 1 kc./s.

TABLE 5

| Specimen No. | WO3 percent by weight | ϵ, tan δ at room temperature | | Temperature characteristic change in dielectric constant (−30° C.−+85° C.) | | | |
|---|---|---|---|---|---|---|---|
| | | | | Maximum in positive | | Maximum in negative | |
| | | ϵ | tan δ, percent | Percent | ° C. | Percent | ° C. |
| 1⊙ | 0 | 1,675 | 2.04 | 8.5 | 85 | −6.4 | −30 |
| 2▲ | 0.05 | 1,615 | 1.92 | 5.7 | 85 | −3.4 | −30 |
| 3○ | 0.1 | 1,594 | 1.61 | 2.7 | 85 | −0.7 | −30 |
| 4× | 0.3 | 1,582 | 1.65 | 3.8 | 85 | −1.6 | −30 |
| 5△ | 0.5 | 1,576 | 1.71 | 4.3 | 85 | −1.9 | −30 |
| 6□ | 1.0 | 1,556 | 1.80 | 4.7 | 85 | −2.3 | −30 |
| 7● | 2.0 | 1,532 | 1.80 | 7.0 | 85 | −4.8 | −30 |
| 8■ | 3.0 | 1,497 | 2.12 | 10.7 | 85 | −8.0 | −30 |

The invention will be better understood from the following description taken in conjunction with the accompanying drawings.

FIGURE 1 gives a ternary diagram showing the relations between the three components of the basic composition within the present invention, that is, barium titanate (BaTiO₃), lead titanate (PbTiO₃) and bismuth stannate (Bi₂(SnO₃)₃), and dielectric constant. The numerical values on the diagram represent the dielectric constants.

Figure 2:
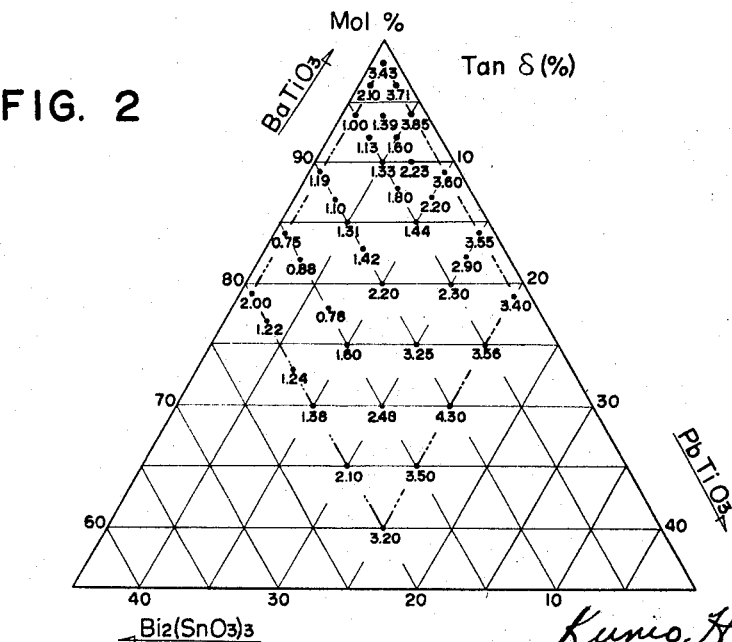
Figure 3:
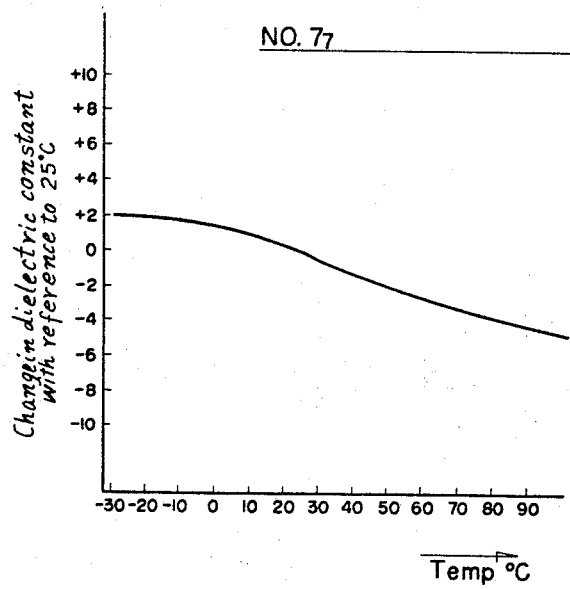
Figure 4:
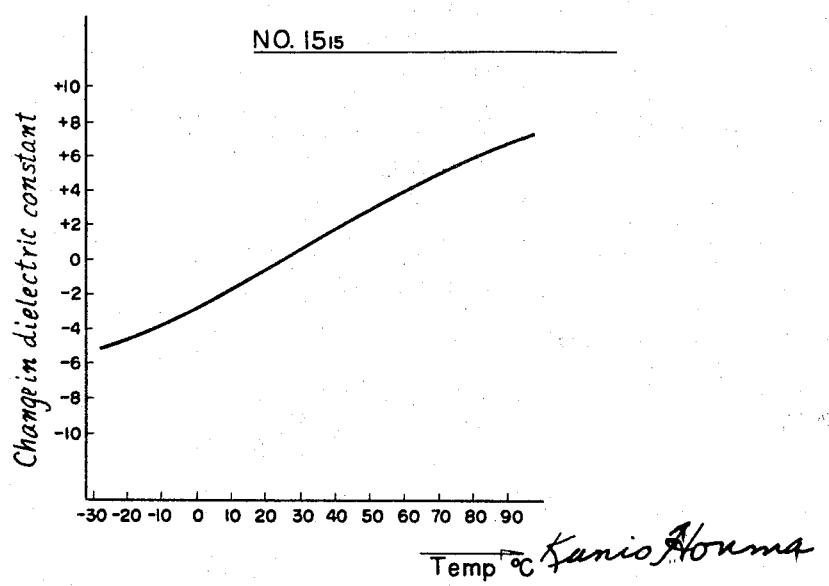
Figure 5:
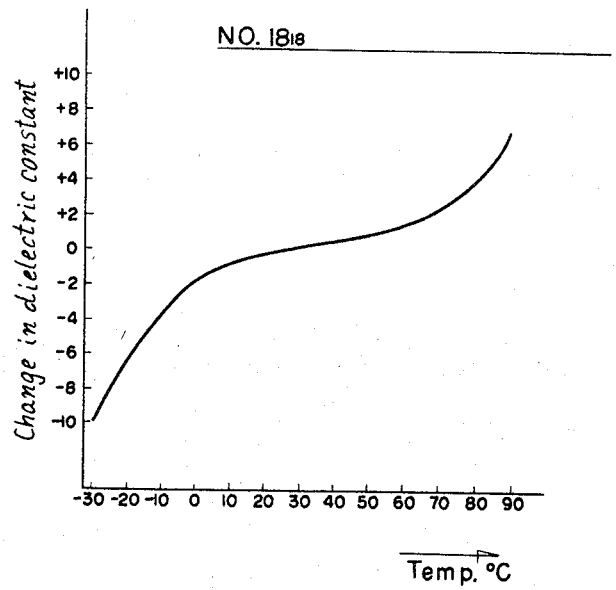
Figure 6:
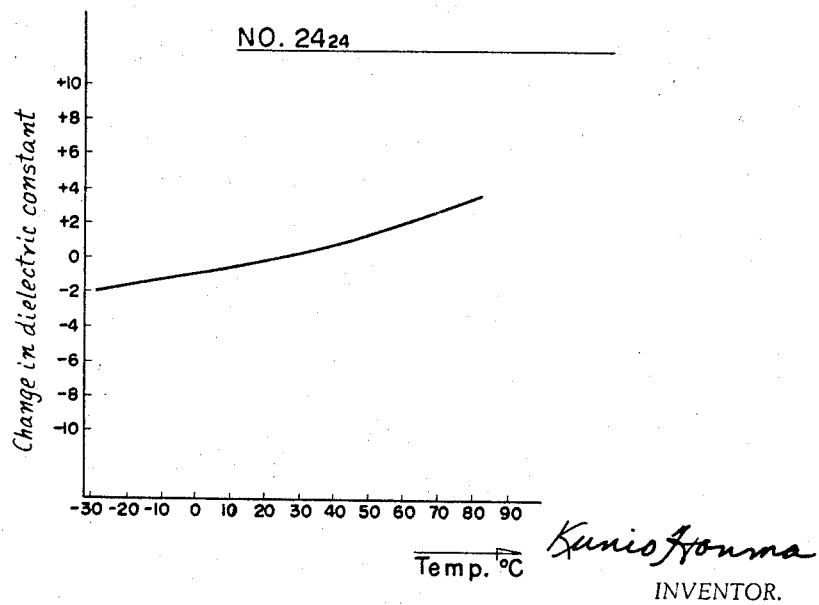
Figure 7:
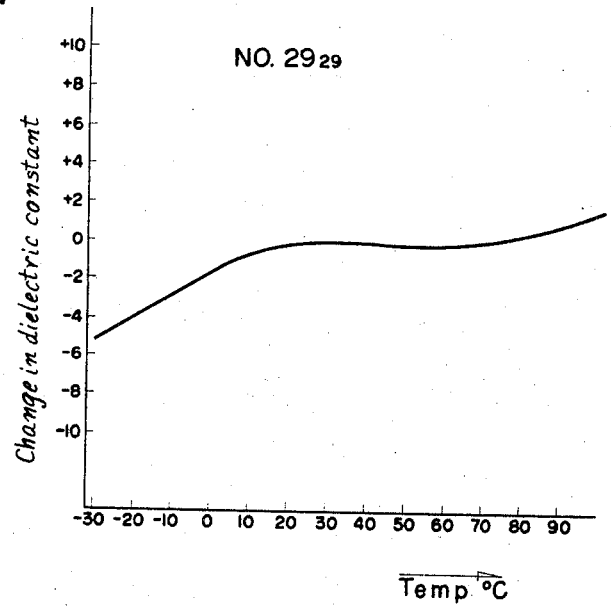

FIGURE 2 gives a ternary diagram showing the relations between the three components, within the present invention, that is, barium titanate (BaTiO₃), lead titanate (PbTiO₃) and bismuth stannate, and dielectric losses, (tan δ).

The numerical values on the diagram represent the dielectric loss, tan δ. FIGURES 3 to 7 represent respectively the relations between the temperature and the change in dielectric constant of the ceramic dielectrics within the present invention. And these figures show the change in dielectric constant depending on temperature concerning the specimens of the Table 1: Nos. 7, 15, 18, 24, and 29. The change in dielectric constant used in these figures is represented by the amount of shift from the value of dielectric constant at 25° C. ($\epsilon_t - \epsilon_{25}/\epsilon_{25}$) × 100.

Figure 8:
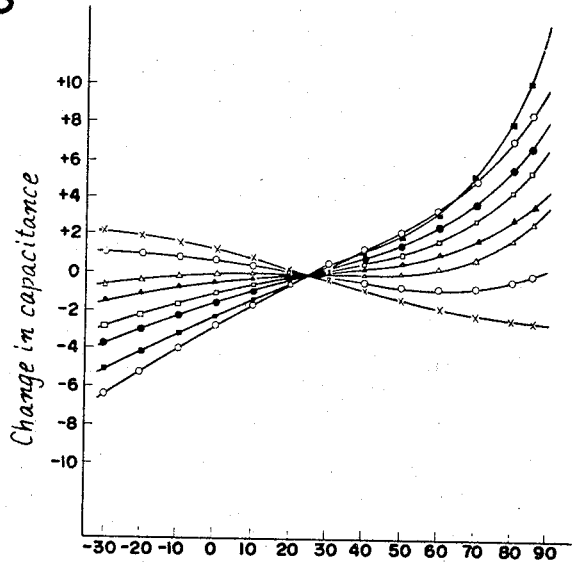

FIGURE 8 represents the temperature characteristic of capacitance of BaTiO₃—PbTiO₃—Bi₂(SnO₃)₃—V₂O₅ type ceramic dielectric.

The indicating numbers of the curves in the drawing correspond to the specimen numbers of Table 2 respectively. Besides, as the temperature characteristic of capacitance, the change in capacitance is represented by the amount of shift from the value of capacitance at 25° C.

Figure 9:
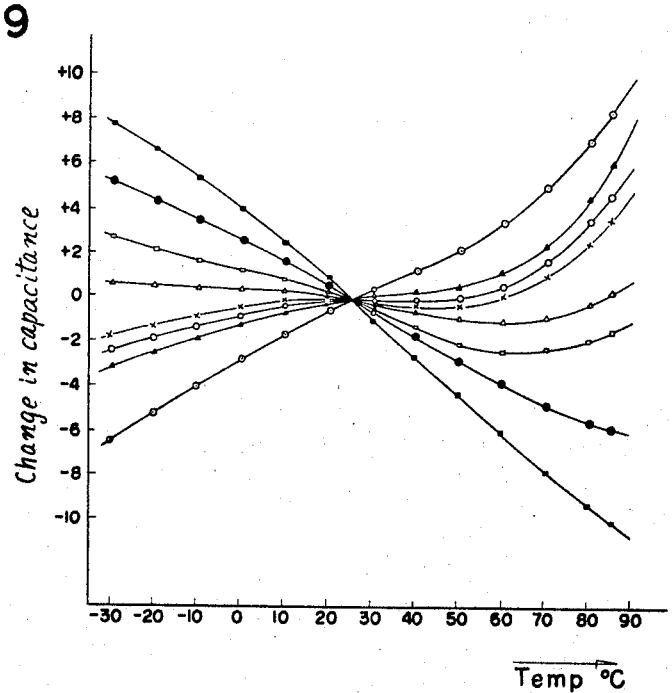

FIGURE 9 represents the temperature characteristic of dielectric constant of BaTiO₃—PbTiO₃—Bi₂(SnO₃)—La₂O₃ type ceramic dielectric.

The indicating numbers of the curves in the drawing correspond to the specimen numbers of Table 3 respectively. Besides, as the temperature characteristic of capacitance, the change in capacitance is represented by the amount of the shift from the value capacitance at 25° C.

Figure 10:
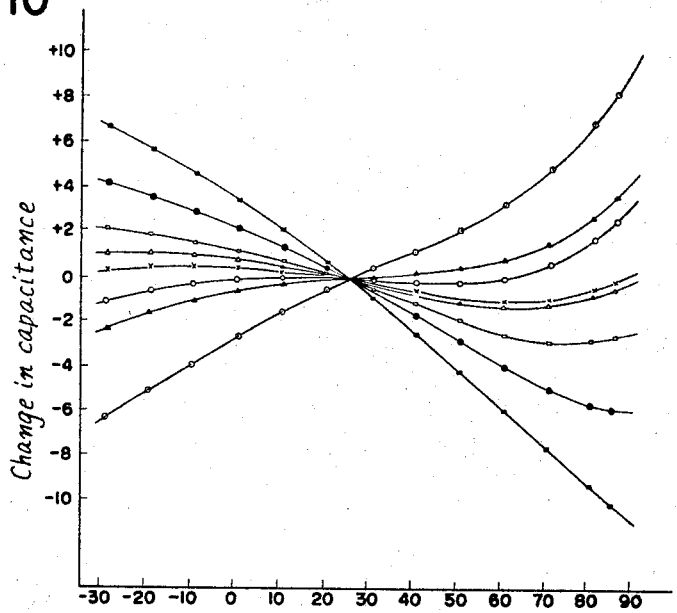

FIGURE 10 represents the temperature characteristic of capacitance of BaTiO₃—PbTiO₃—Bi₂(SnO₃)₃—Nb₂O₅ type ceramic dielectric. The indicating numbers of the curves in the drawing correspond to the specimen numbers of Table 4 respectively. Besides, as the temperature characteristic of capacitance, the change in capacitance is represented by the amount of shift from the value of capacitance at 25° C.

Figure 11:
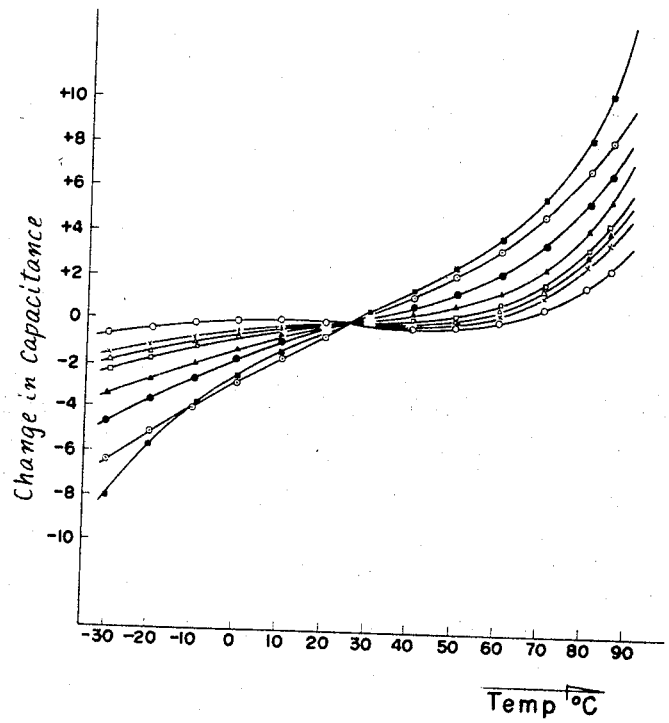

FIGURE 11 represents the temperature characteristic of capacitance of BaTiO₃—PbTiO₃—Bi₂(SnO₃)₃—WO₃ type ceramic dielectric. The indicating numbers of the curves in the drawing correspond to the specimen numbers of Table 5 respectively. Besides, as the temperature characteristic of capacitance, the change in capacitance is represented by the amount of shift from the value of capacitance at 25° C.

Figure 12:
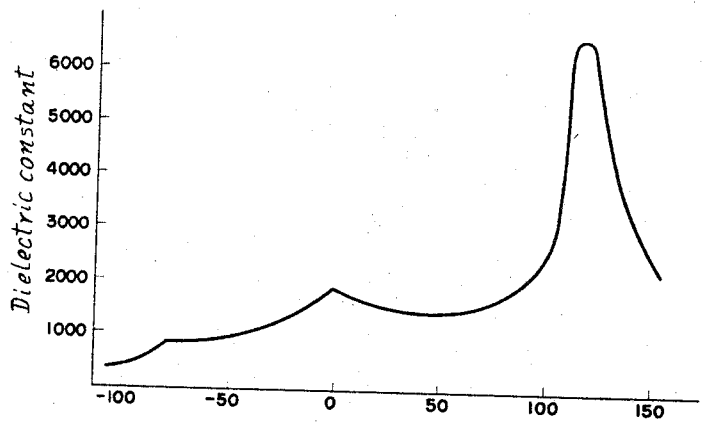

FIGURE 12 represents the temperature characteristic of capacitance of barium titanate (BaTiO₃) type ceramic dielectric which have been used and shows the existence of Curie point at about 120° C.

EXAMPLE I

Prepare barium titanate (BaTiO₃) by mixing barium carbonate (BaCO₃) and titanium oxide (TiO₂) in equivalent molar percent, calcine the mixture at 1280° C. and incorporate lead oxide (PbO), titanium oxide (TiO₂), bismuth oxide (Bi₂O₃) and tin oxide (SnO₂) into it. And after shaping thus obtained mixture of 96 molar percent of barium titanate (BaTiO₃), 1 molar percent of lead titanate (PbTiO₃) and 3 molar percent of bismuth stannate (Bi₂(SnO₃)₃), (hereinafter, this mixture will be called basic mixture), sinter the shaped mixture at 1180° C. and then the ceramic dielectric has been produced. The ceramic dielectric thus obtained shows the dielectric constant (ϵ) at room temperature of 1675, the dielectric loss (tan δ) of 2.04% and the temperature characteristic of dielectric constant (ϵ) at +85° C. of +8.5% and at −30° C. of −6.4% as the maximum values.

EXAMPLE II

Add 0.1 molar percent of vanadium (V) oxide (V₂O₅) to the basic mixture described in above Example I followed by shaping, and sinter it at 1180° C. and then the ceramic dielectric has been produced. Thus obtained dielectric shows the dielectric constant (ϵ) at room temperature of 1598, the tan δ of 1.77% and the temperature characteristic of dielectric constant at −30° C. of +1.0% and at +60° C. of −0.8% as the maximum values.

EXAMPLE III

Add 0.5 molar percent of lanthanum (III) oxide (La₂O₃) to the basic mixture described in Example I, followed by shaping, and re-sinter it at 1180° C. and then the ceramic dielectric has been produced. Thus produced dielectric shows the ϵ at room temperature of 1592, the tan δ of 1.60% and the temperature characteristic of dielectric constant at −30° C. of +0.7% and at +60° C. of −1.0% as the maximum values.

EXAMPLE IV

Add 0.3 molar percent of niobium (V) oxide (Nb₂O₅) to the basic mixture described in Example I, followed by shaping, and sinter it at 1180° C. and then the ceramic dielectric has been produced. Thus obtained dielectric shows the ϵ at room temperature of 1493, the tan δ of 1.60% and the temperature characteristic of dielectric constant at −5° C. of +0.5% and at +60° C. of −1.0% as the maximum values.

EXAMPLE V

Add 0.1 molar percent of tungsten oxide (WO₃) to the basic mixture of Example I, followed by shaping, and sinter at 1180° C. and then the ceramic dielectric has been produced. Thus obtained ceramic body shows the ϵ at room temperature of 1594, the tan δ of 1.61% and the temperature characteristic of dielectric constant at +85° C. of 2.7% and at −30° C. of −0.7% as the maximum values.

What I claim is:
1. A ceramic dielectric sintered mixture wherein the sintered mixture consists essentially of BaTiO₃ in an amount of about 60 to 98 molar percent, $PbTiO_3$ in an amount of about 1 to 20 molar percent and $Bi_2(SnO_3)_3$ in an amount of about 1 to 20 molar percent.

2. A ceramic dielectric consisting essentially of a sintered mixture of $BaTiO_3$ in an amount of from about 60 to about 98 molar percent, $PbTiO_3$ in an amount of from about 1 to about 20 molar percent and $Bi_2(SnO_3)_3$ in an amount of from about 1 to about 20 molar percent, and containing a minor proportion of a member selected from the group consisting of $V_2O_5$, $La_2O_3$, $Nb_2O_5$ and $WO_3$ as mineralizer.

3. A ceramic dielectric, according to claim 2, containing about 0.05 to 2.0 percent by weight of $V_2O_5$ as said mineralizer.

4. A ceramic dielectric, according to claim 2, containing about 0.05 to 2.0 percent by weight of $La_2O_3$ as said mineralizer.

5. A ceramic dielectric, according to claim 2, containing about 0.05 to 2.0 percent by weight of $Nb_2O_5$ as said mineralizer.

6. A ceramic dielectric, according to claim 2, containing about 0.05 to 2.0 percent by weight of $WO_3$ as said mineralizer.

References Cited

UNITED STATES PATENTS

| 2,563,307 | 8/1951 | Burnham et al. | 106—39 |
| 2,658,833 | 11/1953 | Coffeen et al. | 106—39 |
| 2,908,579 | 10/1959 | Nelson et al. | 106—39 |
| 3,268,783 | 8/1966 | Saburi | 317—258 |

OTHER REFERENCES

Lapluye et al.: "Effects of Incorporation of Metallic Oxides on Properties of Barium Titanate," Compt. Rend. 250 (2) January 1960, pp. 305–307.

Ern et al.: "Effect of $WO_3$ on Dielectric Properties of $BaTiO_3$ Ceramics," J. Am. Ceramic Soc., volume 44, April 1961, p. 199.

HELEN M. McCARTHY, *Primary Examiner.*